United States Patent [19]
Durand

[11] 3,736,840
[45] June 5, 1973

[54] WORKTABLE EXTENSION AND SUPPORTING STRUCTURE

[75] Inventor: Alex A. Durand, Milwaukee, Wis.

[73] Assignee: The Falk Corporation, Milwaukee, Wis.

[22] Filed: Dec. 14, 1971

[21] Appl. No.: 207,845

[52] U.S. Cl. .......................90/58 B, 82/2 D, 248/13
[51] Int. Cl. .............................B23c 1/14, B23f 23/00
[58] Field of Search .........................82/2 D; 90/58 B; 248/13; 90/58 R

[56] References Cited

UNITED STATES PATENTS

| | | | |
|---|---|---|---|
| 3,592,102 | 7/1971 | Berthiez | 90/58 R |
| 2,791,144 | 5/1957 | Berthiez | 82/2 D |

FOREIGN PATENTS OR APPLICATIONS

| | | | |
|---|---|---|---|
| 989,354 | 4/1965 | Great Britain | 82/2 D |

Primary Examiner—Francis S. Husar
Attorney—Donald G. Casser and Thomas W. Ehrmann

[57] ABSTRACT

A work table extension system for a machine tool which is arranged with an existing work table of a machine in order to enlarge its workpiece capacity, i.e. to enable the machine to handle large diameter and/or heavier workpieces. The system includes a work table extension adapted to fit onto the existing work table of a machine, outrigger support members positioned to support the peripheral edge of the work table extension, and a hydraulic system for equalizing the load between the outrigger supports. The outrigger supports are constructed to enable rotary motion and linear motion of the work table extension.

8 Claims, 11 Drawing Figures

INVENTOR
ALEX A. DURAND

INVENTOR
ALEX A. DURAND

BY

ATTORNEY

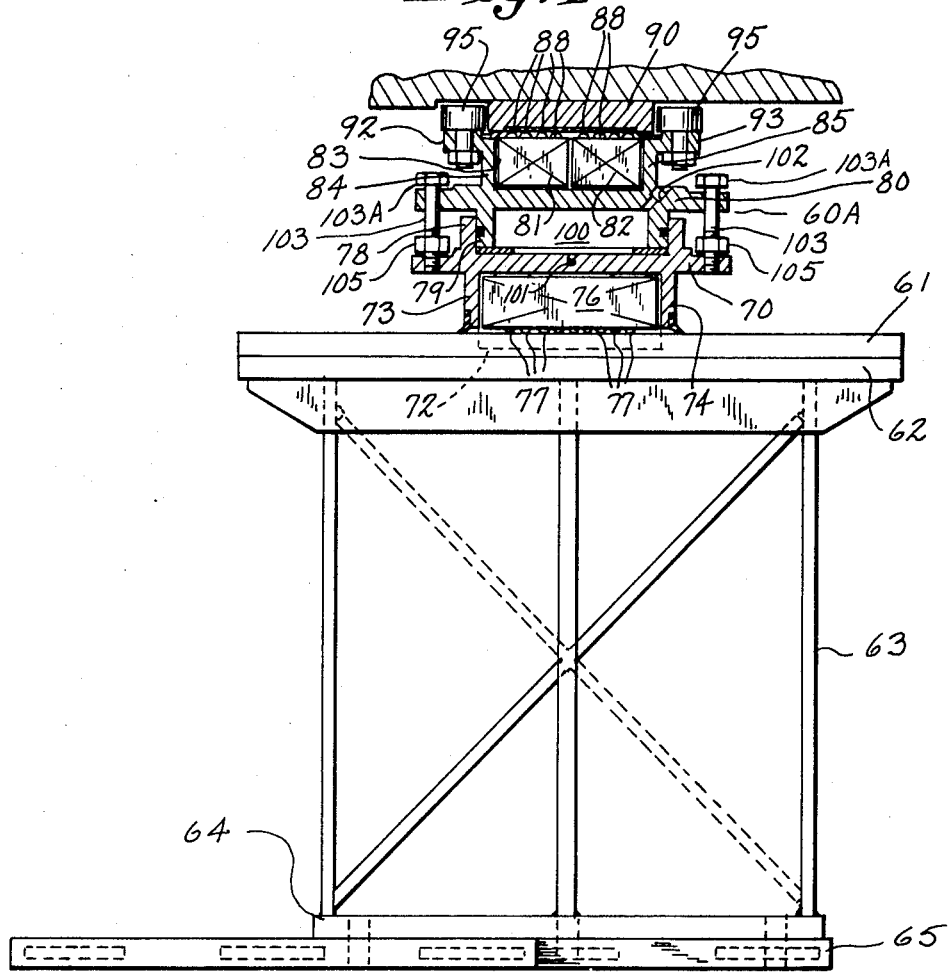
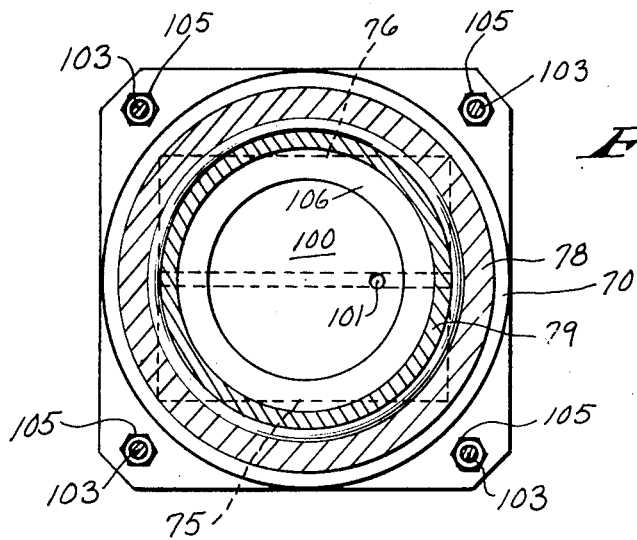

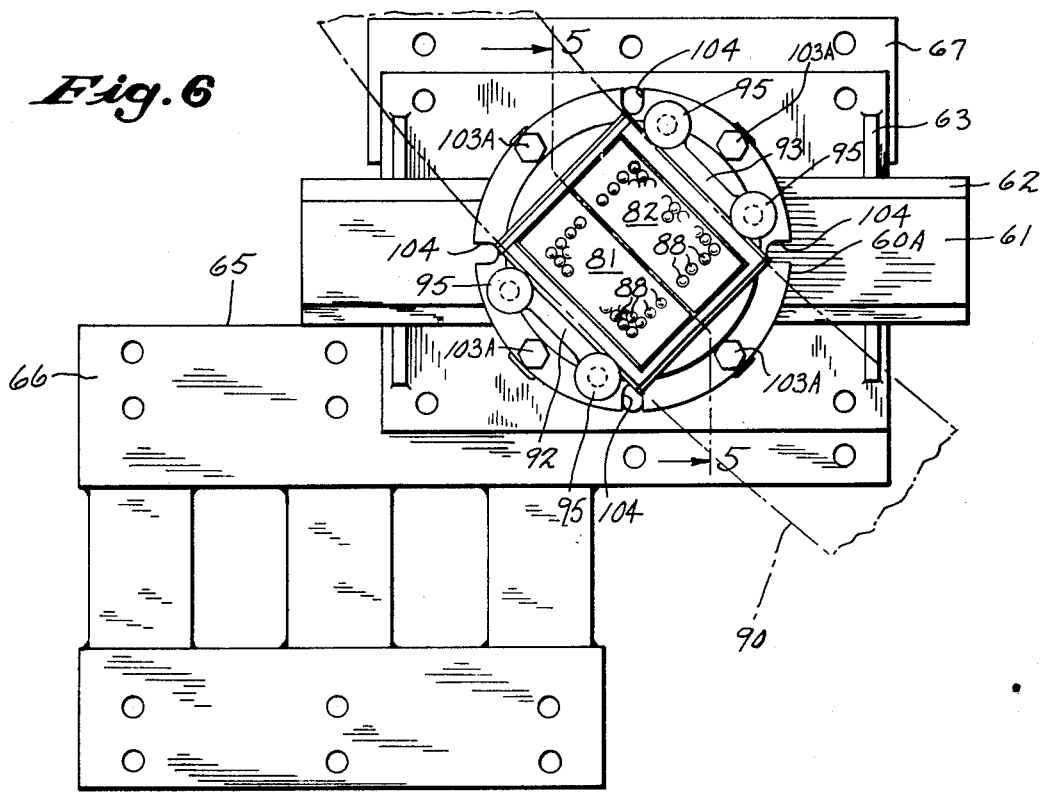
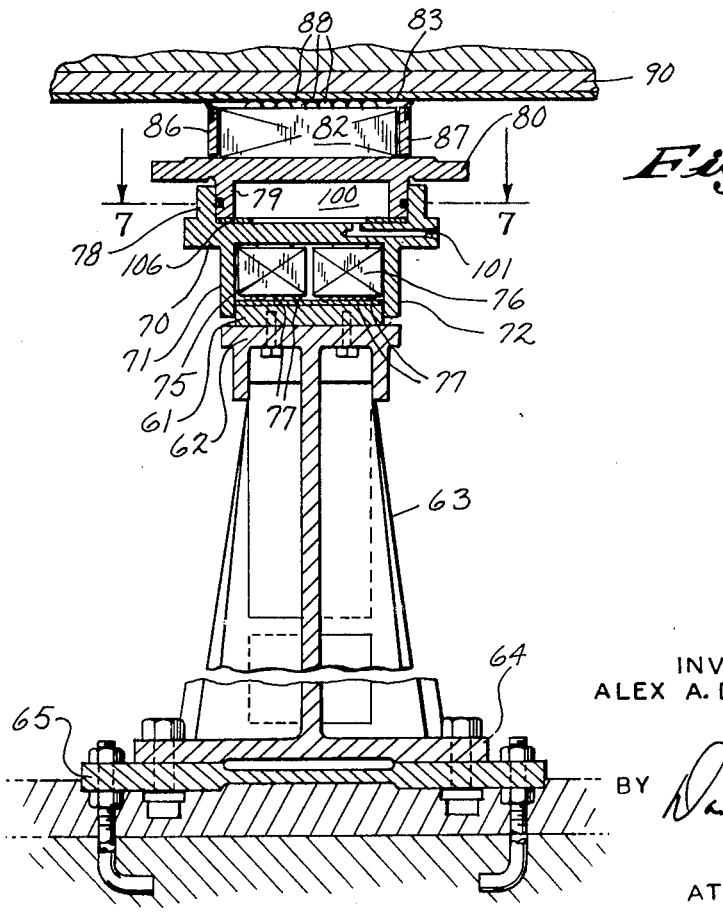

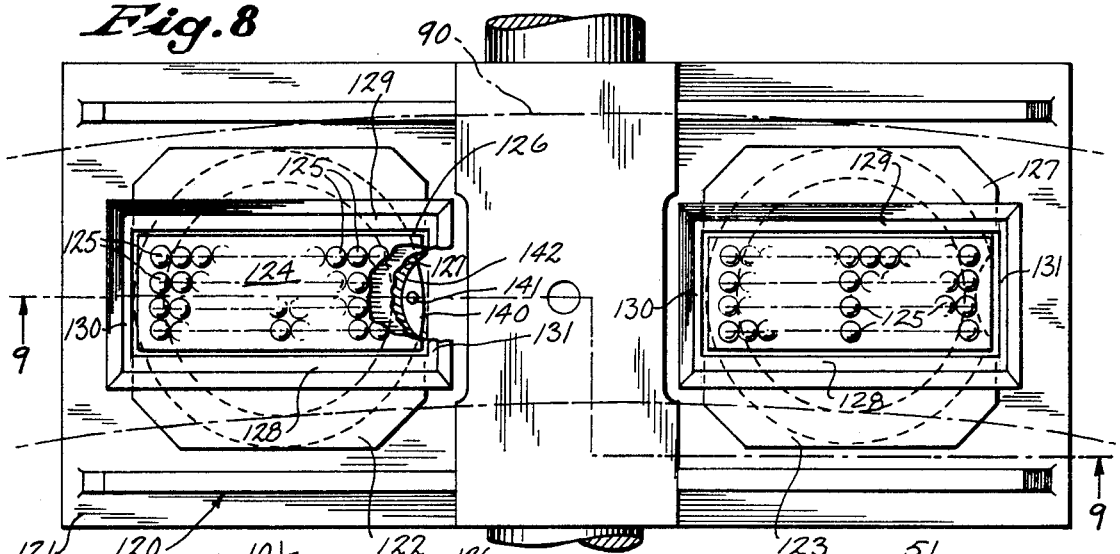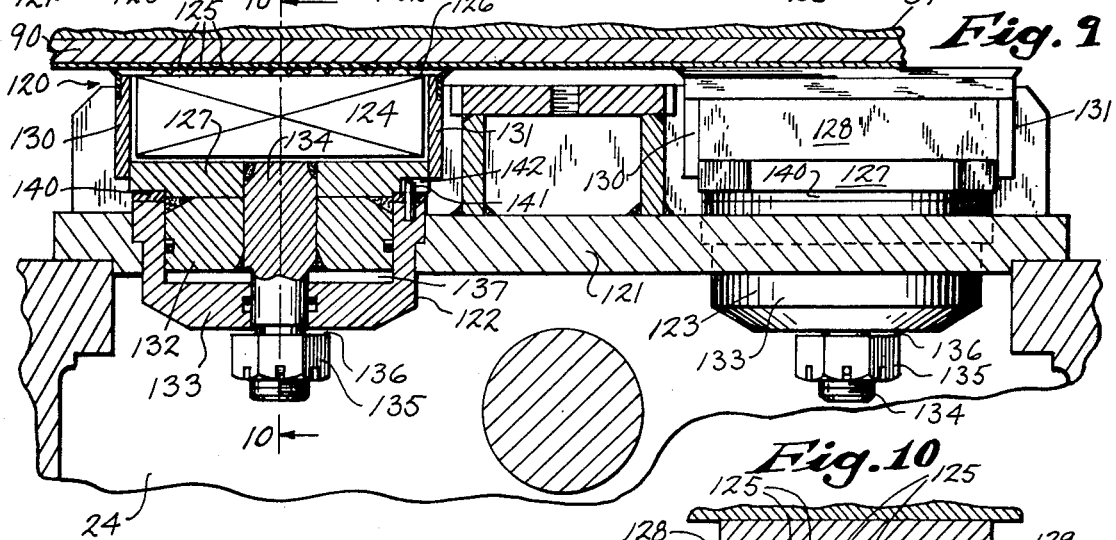

WORKTABLE EXTENSION AND SUPPORTING STRUCTURE

BACKGROUND OF THE INVENTION

This invention relates to the field of supporting workpieces of substantial size during machining operations such as gear cutting, particularly in a manner which admits of both linear and rotary movement of the workpiece.

A typical method for carrying large workpieces on a rotary indexable work supporting table for a machine tool is to provide a supporting bed for the work table that has approximately the same diameter as the table. A construction of this type is difficult or impractical to use to support extremely heavy workpieces of large dimensions, and a massive supporting bed and a large-sized way are needed for large work tables. Further, a machine specifically designed to carry large workpieces cannot handle medium and small workpieces, so that the machine has limited utility. Another method to increase the capacity of a machine with an existing work table is to attach a table extension to the existing table. This results in having the workpiece and table extension extending beyond the existing work table; this overhanging loading is unsupported, so that the size capacity is limited by the acceptable degree of unsupported overhanging load that can be accommodated. Thus, an existing machine can have workpiece size limitations such that the manufacture of larger pieces may often necessitate the use or purchase of a different machine.

SUMMARY OF THE INVENTION

My present invention comprises a work table extension and peripheral supporting structure therefor which provides a workpiece supporting system wherein the work table extension fits onto or is carried by an existing work table so as to be supported as its central portion. The work table extension has a peripheral edge portion that extends beyond the existing work table so as to accommodate large workpieces, and the peripherial supporting structure is in the form of outriggers which support the edge portion of the table extension, there being several such outriggers spaced about the periphery of the work table extension. The outrigger support members support the work table extension in such fashion as to permit it to rotate freely relative to the outrigger supports. Further, the outrigger supports are particularly constructed so as to allow for linear movement of the work table extension while in an edge-supported condition. The outrigger supporting members include an expansible hydraulic chamber structure to support the load imposed upon them. Another important feature is a hydraulic load equalization system which interconnects the outrigger support members in such manner that the loading is substantially equally divided among them.

This invention is intended to meet a number of important objectives. One is to provide a new mode for supporting large work pieces which combines peripheral edge support and central support, instead of relying on only the latter. Another is to provide a work table system which can accommodate workpieces in a considerable variety of sizes, especially one which can handle very large and heavy workpieces.

A further important facet of my present invention is to provide an extension member which can be supported on the work table of an existing machine to enlarge its capacity. A related object is to enlarge the workpiece size capacity of an existing machine in a manner which will retain its ability to handle small and medium size workpieces. Another is to device supporting structure adapted to support the peripheral edge of a work table extension in such manner as to accommodate heavy loading thereon with a minimum of friction so as to enable rotary motion of the table extension relative to the supporting structure; a related objective is to provide supporting structure which will accommodate linear motion of the table extension. A further objective is to provide supporting structure that will admit of both rotary and linear motion of the workpiece table extension.

Other very important objectives of this invention are to develop supporting structure which employ an expansible hydraulic chamber to carry substantial loads; to provide an interconnecting system for equalizing the loading between each supporting structure; and to provide a hydraulic load equalization system which automatically adjusts for variations in loading of the various supporting members.

A more specific object is to provide the particular details of structure hereinafter claimed.

DESCRIPTION OF THE DRAWINGS

The above and further objects and advantages of this invention will become more apparent from the following description taken in conjunction with the accompanying drawings in which

FIG. 4 is an enlarged detailed view partly in elevation and partly in vertical section of one of the outrigger supports showing the internal mechanism of the operative support structure;

FIG. 5 is an enlarged detailed view of an outrigger support partly in elevation and partly in vertical section taken along the plane represented by the line 5—5 in FIG. 6;

FIG. 6 is an enlarged plan view of an outrigger support and base as depicted in FIGS. 4 and 5;

FIG. 7 is an enlarged detailed view in horizontal section taken along the plane of line 7—7 in FIG. 5;

FIG. 8 is a plan view of a modification of an outrigger support;

FIG. 9 is a detailed view in vertical section taken along the plane of line 9—9 in FIG. 8, of the modified outrigger support;

FIG. 10 is a vertical sectional view taken through a roller housing along the plane of line 10—10 in FIG. 9; and FIG. 11 is a schematic view of the hydraulic system utilized in the workpiece supporting system of this invention.

DESCRIPTION OF THE PREFERRED EMBODIMENTS

1. Background Description

Figure 1:
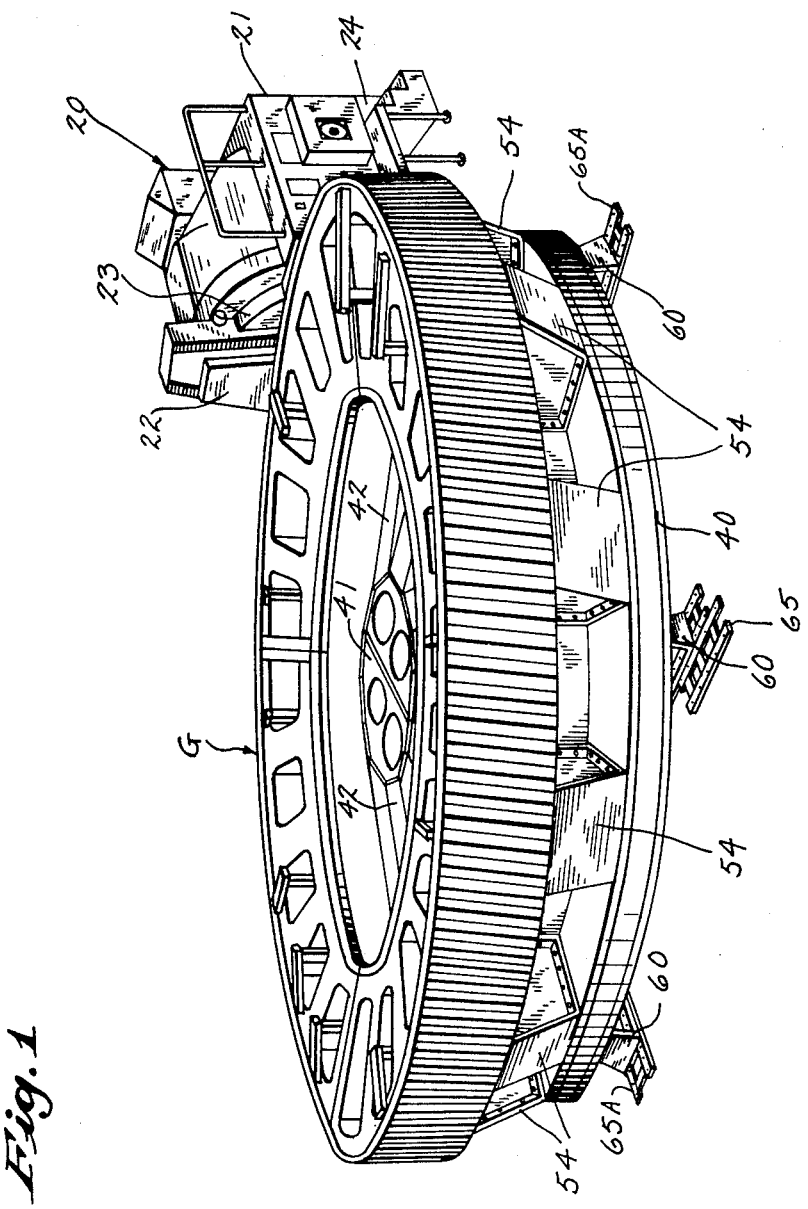
FIG. 1 is a general view of a machine tool with which the invention has been advantageously incorporated.

Referring now to FIG. 1, the present invention is shown as being incorporated with a machine tool 20 operatively arranged to generate gear teeth in the peripheral surface of a gear, sometimes referred to hereinafter as the workpiece "G".

The machine tool 20, which is not the subject matter of this invention and thus will only be described generally, comprises a frame structure 21 supporting a tool carrying ram 22 that is driven for vertical movement. The tool carrying ram 22 reciprocates in guideways in a swivel head 23 that is supported for rotary movement on the front surface of the machine tool. The arrangement is such that the tool carrying ram is driven in a straight line path of travel to cut gear teeth on the workpiece, and the swivel head may be rotated for angularly positioning the tool carrying ram with respect to the workpiece to cut helical gears if desired.

Figure 3:
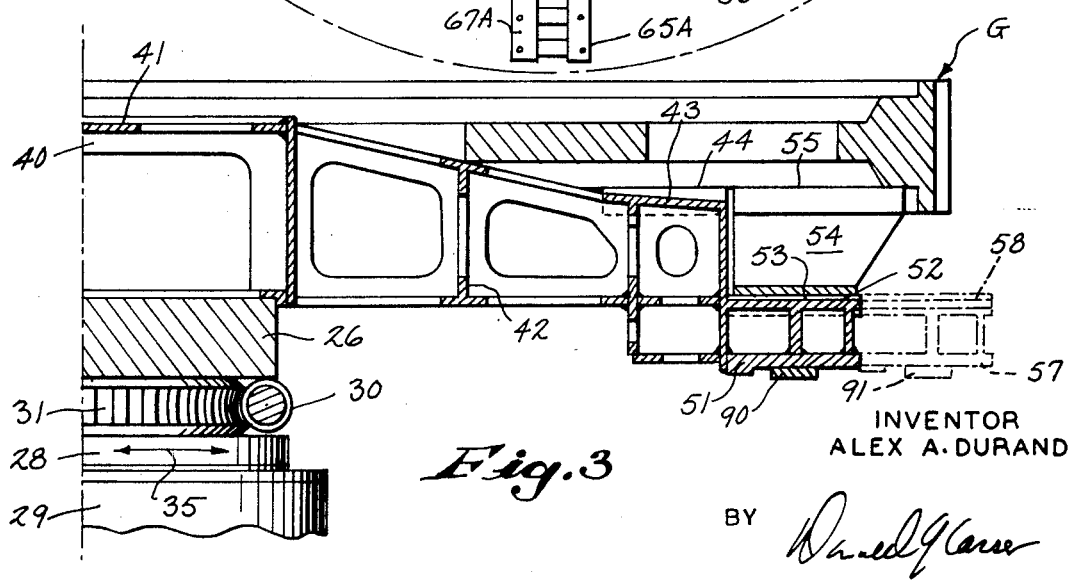
FIG. 3 is an enlarged fragmentary view in vertical section through the table extension taken along the plane represented by the line 3—3 in FIG. 2, a portion of a large diameter gear workpiece being shown thereon.

The machine tool 20 includes, see now FIG. 3, a work supporting table 26 which is rotatably carried on a base 28. The base 28 is supported for rectilinear movement on a suitable way surface provided on the upper part of a floor mounted bed 29. The work supporting table 26 is rotatably driven by means of a worm 30 that is operatively meshed with a worm gear 31 formed as a peripheral portion of the table. The base 28 is driven by a lead screw for rectilinear movement of the table 26 and rotary movement of the table 26 is supplied by the worm and worm gear so that a compound feeding movement may be used to advance the workpiece relative to the cutter carried by the tool operator 22, thereby enabling the cutting of various types of gear teeth and tooth forms.

2. Description of Work Table Extension

The work table 26 of a machine tool such as described above has both size and load carrying limitations which restrict the size and weight of gear that can be cut by the machine. My present invention is directed to means for expanding the size range of gears that can be made on the machine. Briefly, the invention includes a work table extension 40 (see FIG. 1), adapted to be carried on the existing work table 26 of the machine and extend beyond the table 26, combined with a plurality of outrigger supports 60 arranged to support the periphery of the work table extension 40. The work table extension will be described in this portion of the specification and the supports 60 described in the succeeding portion.

Figure 2:
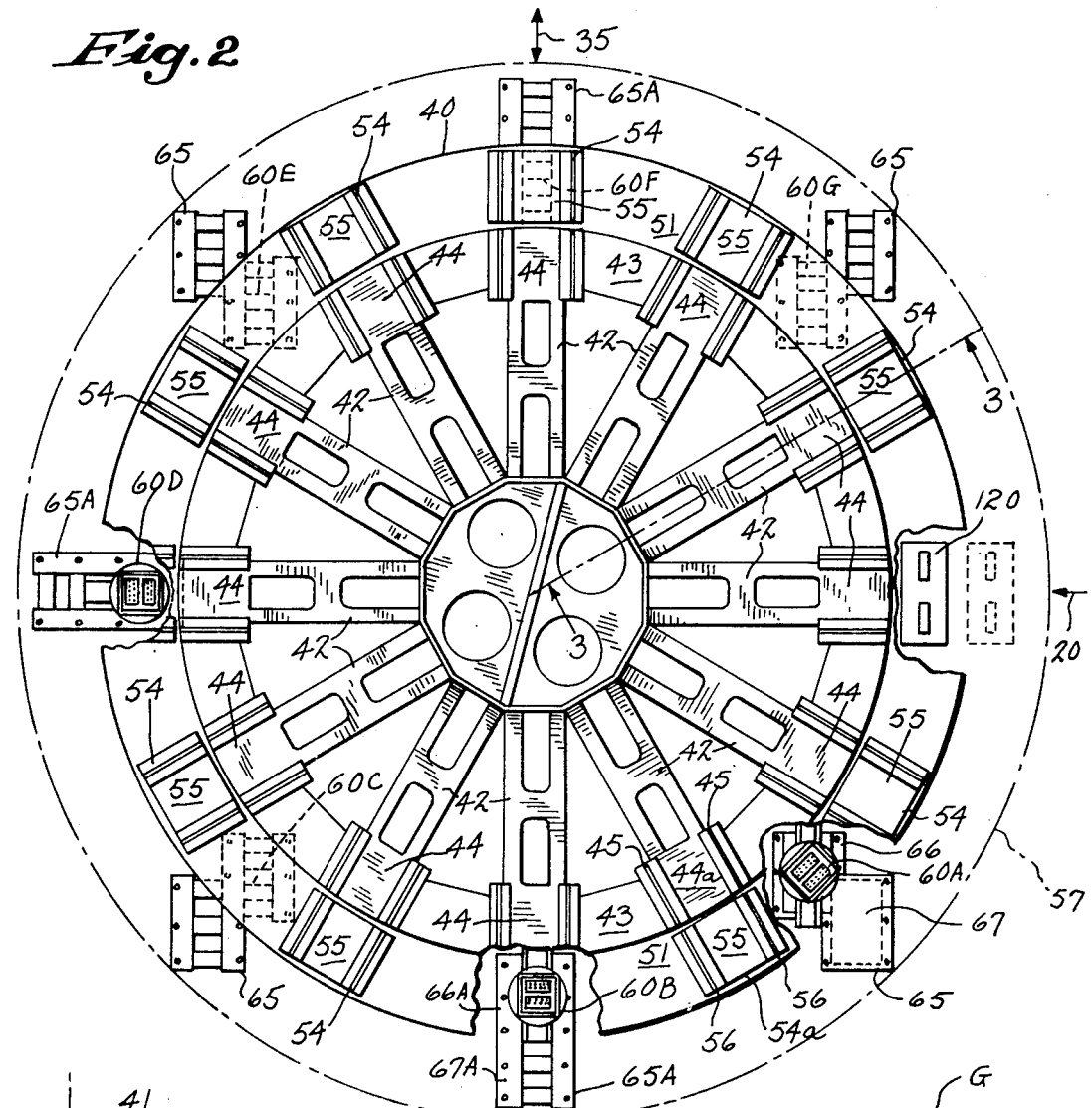
FIG. 2 is a plan view of the improved workpiece supporting table extension of this invention as shown in FIG. 1, with parts broken away to show the general arrangement of several of the outrigger table bearing supporting structures.

Turning now to FIGS. 2 and 3, the table extension 40 is a fabricated structure having a central circular section 41 which is secured, as by being bolted, to the top surface of the work supporting table 26 of the machine so as to move in conjunction therewith. A plurality of radially extending fabricated arms 42 are secured to the periphery of the central section 41, as by being welded thereto, and support a circular inner workpiece support base 43 secured about their outer ends. The inner support base 43 is provided with a horizontal clamping surface 44 in which a plurality of T-slots 45 are formed, see clamping surface 44a in FIG. 2. These T-slots receive T-bolts which are utilized to clamp a workpiece fixture or the workpiece in position on the table extension 40.

The table 40 thus far described is adapted to receive large diameter workpieces with the peripheral edge thereof being located and clamped on the clamp surfaces 44 of the inner support base 43. However, it is contemplated that the table 40 will be utilized to accommodate workpieces in a range of sizes, including workpieces with a diameter larger than the diameter of support base 43. For this purpose, a circular intermediate support base 51 is welded to the peripheral outer surface of the inner supporting base 43. The support base 51 is at an elevation which provides clearance for the machine tool ram 22 and swivel head 23 when the workpiece is smaller than the outer periphery of the support base 51. At each location of a clamp surface 44 of the inner supporting base 43, the intermediate supporting base 51 is provided with clamping surfaces 52 in which T-slots 53 are formed. The intermediate supporting base 51 is adapted to receive a plurality of fixture or steady rest structures 54 which are secured to each of the clamp surfaces 52 provided on the supporting base 51.

The steady rest structures 54 are similar in construction and are fabricated units with top clamp surfaces 55 having T-slots 56 formed therein, see steady rest 54a in FIG. 2. The clamp surface 55 of each steady rest 54, in the present arrangement is disposed in the same horizontal plane as the adjacent associated clamp surfaces 44 provided on the inner supporting base 43. However, the steady rests 54 may vary to suit particular workpiece configurations that will be encountered.

In order that the table extension 40 be as universal as possible and to accommodate workpieces having extraordinarily large diameters, an annular outer support base 57 is provided, as depicted in dotted lines in FIG. 3. The support base 57 is also fabricated and fitted to the peripheral outer surface of the intermediate support base 51. The outer support base 57 is also provided with clamp surfaces 58 constituting an extension of the associated adjacent clamp surfaces 52 formed on the intermediate supporting base 51.

The work table extension 40, as thusly constructed, is capable of accommodating workpieces in several ranges of diameters. In a particular installation of this invention, a workpiece having a diameter of up to 27 feet is located and supported on the table extension 40 with its periphery located and clamped onto the inner supporting base 43, a workpiece having a diameter from 27 feet up to approximately 32 feet was accommodated with its peripheral edge being supported and clamped on a plurality of spaced steady rest structures 54 clamped to the intermediate support base 51, an a workpiece whose diameter is greater than 32 feet and up to 40 feet had its peripheral edge supported and clamped to steady rest structures 54 clamped to the outer supporting base 57. The table extension 40 need not have three supporting bases as shown, but can have more or less as may suit a particular case, but a plurality of such supporting bases enlarges its utility.

3. Description of Outrigger Supports

Bearing in mind that it is contemplated the work table extension 40 will be used to support very large workpieces that may be as large as forty feet in diameter, the extension 40 itself may weigh as much as 100,000 pounds and carry table loads weighing as much as 500,000 pounds. These extremely heavy loads require further supporting in order to relieve the loading on the existing work table 26 of the machine tool 20 so that the table 26 will not be damaged, the heavy workpieces can be accurately indexed by the machine in order to generate accurate tooth forms, and in order to prevent undue peripheral deflection of the workpieces that would impair the production of a satisfactory gear. To solve this problem, the present invention provides a plurality of novel outrigger supports 60A to 60G for supporting the peripheral edge of the table extension 40. These outrigger supports are operative to maintain the peripheral edge of the table 40 in a horizontal plane under extremely heavy table load conditions with a minimal amount of deflection.

The outrigger supports 60 are similar in construction and operation and the description for the support 60A will apply to all of them. As illustrated in FIGS. 4, 5 and 6 the support 60A is disposed on an elongated bearing plate 61 which is secured to horizontal cap plate 62 carried by an upright fabricated column 63. The base 64 of the column 63 is adapted to be bolted to a floor plate 65 that is secured in operative position beneath the intermediate and outer supporting bases 51 and 57 of the table 40. The floor plate 65 is a dual location plate having staggered column receiving positions 66 and 67.

The floor plate 65 associated with the column 63 of each of the outrigger supports 60 is oriented with respect to the under surface of the peripheral edge of the table 40 as depicted in FIG. 2. The plate 65 associated with the outrigger support 60A is oriented so that its column receiving position 66 is disposed directly below the intermediate support base 51 portion of the table 40 and the column receiving position 67 of the plate 65 is disposed directly below the outer supporting base 57 of the table 40. Therefore, depending upon the diameter of the workpiece "G" the outriggers 60 will be positioned with respect to either the intermediate support base 51 or the outer supporting base 56 of the table to provide maximum support for the table and workpiece. However, the floor plates 65A associated with outrigger supports 60B, 60D and 60F differ in arrangement from the floor plates 65 associated with outrigger supports 60A, 60C, 60E and 60G. This is necessary because the table 40 is movable rectilinearly along the "X" axis transverse to the axis of the machine as indicated by the arrow 35 in FIG. 2. Thus, in order to support the outrigger supports 60B, 60D and 60F with their axis parallel to the "X" axis along which the table is movable, in supporting position under the intermediate base 51 or the outer base 57 of the table, the floor plates 65A are constructed with their two locating positions disposed in axial alignment rather than in the staggered arrangement of plates 65. Each support plate 65A is arranged so that its column receiving position 66A is disposed directly below the intermediate support base 51 of the table 40, and its alternate column receiving position 67A is disposed outwardly from the position 66A and located directly below the outer support base 57.

Returning now to FIGS. 4–6, the outrigger support 60A includes a square shaped lower bearing carriage 70 which is provided with a pair of depending spaced side plates 71 and 72 that extend downwardly on either side of the bearing plate 61. A pair of lateral closure plates 73 and 74 are secured to the ends of the side plates 71 and 72. The depending structure formed by the side plates 71 and 72 and the end plates 73 and 74 provides a bearing chamber in which a pair of antifriction bearing members 75 and 76 are located. The side plates 71 and 72 in addition to operating as side walls of the bearing chamber also operate as restraining guides to maintain the outrigger support 60A in operative guided engagement on the bearing plate 61.

The antifriction bearing members 75 and 76 are commercially available units which present a plurality of parallel rows of circuit paths in which antifriction bearing elements 77 such as ball bearings are constrained for rolling movement therein. The antifriction bearing elements 77 are arranged to roll on the hardened upper surface of the column bearing plate 61 so as to support the outrigger 60A for linear movement along the top of the plate 61.

Extending upwardly from the top surface of the lower bearing carriage 70 is a circular collar portion 78 which operates as a cylinder for receiving piston 79. The piston 79 is constructed as a circular collar which depends from the undersurface of a circular upper bearing carriage 80. As shown, the depending collar portion 79 of the upper bearing carriage 80 is constructed to fit closely within the interior of the upwardly extending collar portion 78 of the lower bearing carriage 70. Thus, the collar portion 78 defines a cylinder in which the depending collar portion 79 is received.

A pair of antifriction bearing members 81 and 82 are disposed on the upper surface of the upper bearing carriage 80 and are maintained thereon by being confined in operative position within a chamber 83. The chamber 82 is defined by upwardly extending side plates 84 and 85 that are welded to the top surface of the upper bearing carriage 80. End plates 86 and 87, FIG. 5, are secured to the ends of the side plates 84 and 85 and serve to close the ends of the chamber 83 and confine the antifriction members 81 and 82 in operative position therein. The bearing members 81 and 82 are similar to the bearing members 75 and 76 but are arranged in inverted relationship thereto. Thus, the bearing members 81 and 82 are disposed within the chamber 83 so that the plurality of bearing elements 88 of each of the members are facing upwardly. The bearing elements 88 are arranged in parallel rows of circuit paths with each row having a plurality of the bearing elements 88 therein. These bearing elements 88 are disposed to engage the hardened undersurface of a circular way 90 that is secured to the undersurface of the intermediate support base 51. However, should the outrigger support 60A be arranged to cooperate with the outer supporting base 57, the bearing elements will engage the hardened surface of an associated circular way 91, see FIG. 3.

The upwardly extending side plates 84 and 85 are each provided with laterally outwardly extending flanges 92 and 93 respectively. Each of the flanges 92 and 93 support a pair of spaced guide rollers 95 as depicted in FIGS. 4 and 6. The guide rollers 95 are disposed so that there are two rollers on either side of the way 90 and operate to establish and maintain the outrigger support 60A directly below the way 90. This is true because, as previously mentioned, the entire outrigger support 60A is supported on the antifriction members 75 and 76. The entire outrigger support 60A is free to move in either direction on the bearing plate 61, as viewed in FIG. 6, ad any displacement of the outrigger 60A in either direction on the bearing plate 61 away from vertical alignment with the way 90 is immediately counteracted by operation of the rollers 95 acting against the inner or outer sides of the circular way 90.

Should movement of the table 40 along the "X" axis in either direction be effected, the side of the circular way 90 which is leading in relation to the direction of table movement will engage its adjacent pair of rollers 95 and thereby effect movement of the entire outrigger support along the bearing plate 61.

Hydraulic fluid under pressure is supplied to the expansible chamber 100 defined by the cooperating circular collar 78 and the depending circular collar 79 of the lower carriage 70 and upper carriage 80 respectively. To supply pressure fluid to the expansible chamber 100 a fluid passage 101 is provided that has communication with a side edge surface of the lower bearing carriage 70 and also with interior of the expansible chamber 100, as shown in FIG. 5.

For the purpose of limiting the travel of the upper bearing carriage 80 to a predetermined maximum distance of upward movement, restricting or limiting means are provided. To this end, as shown in FIGS. 4 and 6, a plurality of bolts 103 are provided which are threaded into suitable openings provided in the non-rotatable lower bearing carriage 70. The bolts 103 extend upwardly from the carriage 70 and engage in aligned U-shaped bolt receiving openings 104 that are formed in the edge of the upper bearing carriage 80. The upper end of each of the bolts 103 are provided with integral hexagonal heads 103A against which the upper bearing carriage engages when the limit of upward movement has been attained. By adjusting the amount of threaded engagement of bolt 103 with lower bearing carriage 70, the distance the upper bearing carriage may move upwardly is thus controlled. The lower end of each of the bolts 103 threadedly receive a nut 105 which engages the square shaped flange of lower bearing cage. Nut 105 serves to lock bolt 103 in its desired adjusted attitude. Spacer ring 106 establishes the lowermost position of the upper bearing carriage.

As previously mentioned, the bearing members 81 and 82 are positioned so that the plurality of rows or circuit paths in which the bearing elements 88 are disposed are arranged so as to be substantially aligned to the direction of table rotation. To effect the positioning of the upper bearing carriage 80 at each particular location of the outrigger supports 60, advantage has been taken of the travel restricting bolts 103. The upper bearing carriage 80 has a number of U-shaped openings 104 so that it can be adjusted angularly to have the circuit paths of the bearing members 88 disposed in the desired relationship with respect to the rotational movement of the table 40. With the desired position of the bearing members 88 established, the bolts are engaged in U-shaped openings which are formed in the peripheral edge of the carriage 80 and that are in alignment with the threaded bolt receiving openings in the lower bearing carriage 70. The bolts 103 are then engaged in the lower bearing carriage 70 and extend through the particular aligned U-shaped openings of the upper bearing carriage 80. Thus, the bolts operate to restrict the upward movement of the upper bearing carriage 80 to a predetermined established limit and also operate to maintain the upper bearing carriage 80 in a desired angular position relative to the lower carriage 70.

FIGS. 8, 9 and 10 show a modification of the outrigger support discussed above. The modified outrigger support is advantageously applicable to a machine tool in which the foundation or base of the machine tool extends forwardly and also serves as supporting base for the table mechanism. Under this condition there is no space in which an outrigger support column can be located and it is therefore necessary to support the outrigger support on the extended machine base. To this end, the modified outrigger 120 includes a base plate 121 which is adapted to be secured to a portion of the bed 24 of the machine 20 that extends forwardly of the machine for supporting the work table 26. Antifriction supports 122 and 123 are mounted in the base plate 121 and are disposed to give rolling support to the peripheral edge of the table extension 40. The antifriction supports 122 and 123 are identical and the description of the support 122 will also apply to the support 123.

The support 122 includes an antifriction member 124 having a plurality of parallel circuit paths in which ball bearing elements 125 are arranged for free circulating movement therein. The bearing member 124 is carried within a box-like enclosure 126 attached to the top surface of a cap plate 127. The enclosure 126 comprises a pair of spaced side walls 128 and 129 welded to the top surface of the cap plate 127, as depicted in FIG. 10. A pair of end walls 130 and 131 are secured as by screws to the ends of the side walls 128 and 129 to form the enclosure 126.

A piston and cylinder mechanism is provided to effect vertical adjustment of the bearing member 122 into supporting engagement with the way 90 of the intermediate supporting ring 51. A piston 132 is reciprocally disposed within a cylinder 133 that is carried in a hole formed in the base plate 121. The piston 132 is welded or otherwise secured to the bottom of the cap plate 127. The arrangement is such that the cap plate 127 and piston 132 move vertically as a unit. As a result vertical upward movement of the piston 132 and plate 127 will operate to move the bearing member 124 upwardly to thereby engage its bearing elements 125 with the downwardly facing surface of the way 90.

A restraining rod 134 is included to limit the upward movement of the plate 127 and piston 132 to a predetermined distance. The rod 134 is disposed in axially aligned openings bored in the plate 127 and piston 132 and is secured to the plate. Thus, the plate 127, piston 132 and rod 134 are operatively connected together to act as a unit. The lower end of the rod 134 extends through an axial opening formed in the bottom of the cylinder 133. The end of the rod 134 is threaded to receive a nut 135. By adjusting the nut 135 so as to move it towards or away from the bottom of the cylinder 133 a predetermined space 136 may be established between the nut 135 and the bottom of the exterior surface of the cylinder 133. The width of the space 136 determines the distance that the cap plate 127 and piston 132 is permitted to move upwardly.

To effect upward movement of the piston 132 for moving the bearing member 124 into engagement with the surface of the way 90 to counteract the loading on the peripheral edge of the table 40, hydraulic fluid is supplied at a predetermined pressure to the chamber 137 within the cylinder 133 below the piston 132. A fluid inlet passage 138, FIG. 10, is drilled from the exterior of the cylinder into the chamber 137, with a suitable fluid connection being made to a source of pressure fluid for supplying the fluid to the chamber.

In order that bearing 124 may adjust radially about its vertical axis so as to maintain its bearing circuit paths in substantial parallel relationship to the direction of rotation of the table extension 40, the cap plate 127 is arranged to have limited angular movement relative to the cylinder 133. This angular adjustment has been found advantageous so as to maintain the bearing circuit paths substantially parallel to the direction of rotation of the table when the table extension 40 is moved along the "X" axis. The outrigger supports 60 are movable with the table so as to maintain the circuit paths of their associated bearing members in substantial parallelism with the direction of table rotation, but the outrigger support 120 is fixed to the extension of the machine bed 24 and thus is not movable to adjust with the table movement. A spacer 140 is inserted between the edge of the cap plate 127 and the end of the cylinder 133 and serves as a fitting spacer to limit the retraction of piston 132 when fluid pressure is relieved in chamber 137. The cap plate 127 is raised slightly above spacer 140 when fluid chamber 137 is energized to bring the bearing elements 125 into engagement with the surface of way 90. To limit the angular movement of the cap plate 127, a pin 141 is disposed in a suitable opening formed in the end of the cylinder 133 as shown in FIG. 9. The pin extends outwardly from the end of the cylinder 133 and engages in an adjacent arcuate keyway 142 formed in the bottom surface of the extending edge of the cap plate 127, see FIG. 8.

To maintain the cylinder 133 stationary within the opening in the plate 121 so that it will not move angularly with the cap plate 127, a locking pin 143 is disposed within a horizontal opening 144 formed in the plate 127, as shown in FIG. 10, and extends into a vertical keyway 145 formed in the external side of the cylinder 133.

The outrigger support 120 is operable to support the extending peripheral edge of the table extension 40 under the machine cutting station in place of the outrigger support 60. This positioning of the support 120 is shown in FIG. 2. The hydraulic cylinders of the support 120 are connected together with the chambers of the outrigger supports 60 as will be explained hereinafter, and the area of the two chambers 137 in support 120, when added together, is to equal the area of a chamber 100.

4. Description of Hydraulic Load Equalization System

FIG. 11 is a schematic showing of a hydraulic circuit that is usable for supplying fluid pressure simultaneously to the expansible chambers of the outrigger supports. The pressure fluid circuit is connected to supply pressure fluid to the seven outrigger supports 60A–60G and the outrigger support 120 which is utilized at the work station of the machine.

As shown in FIG. 11, the expansible chambers 100 of the outrigger supports 60A–60G and the two expansible chambers 137 of the outrigger support 120 are all connected in the circuit in parallel relationship. This arrangement ensures that all the chambers 100 and 137 will receive fluid under the same pressure.

Fluid pressure in the hydraulic circuit is provided by a hydraulic pump 150 which includes a fixed cylinder 151 in which a piston 152 is reciprocally supported for pumping fluid in the chamber 153 on the head side of the piston 152 into the connected main fluid supply line 154.

Actuation of the piston 152 is effected through the operation of an air pump or intensifier 155 that comprises a cylinder 156 in which a piston 157 is reciprocally supported. A piston rod 158 interconnects the piston 157 of the air pump with the piston 152 of the oil pump 150. Air at a predetermined pressure is supplied to the chamber 159 at the head side of the piston 157 through a solenoid actuated directional flow control valve 160 through air line 161. Another air line 162 has one end connected to a chamber 163 on the rod side of the piston 157 and has its opposite end connected to another port of the valve 160. The valve 160 is normally operable to direct air under pressure to the chamber 163 of the pump or intensifier 155 with the chamber 159 being connected to atmosphere so that the main supply line of the hydraulic circuit is not under pressure.

Air under pressure is supplied to the inlet port of the valve 160 from a source (not shown) such as a pump via connected line 164 in which a manual adjustable regulator 165 and pressure gauge 166 are interposed. The regulator 165 is manually adjustable to suit the load conditions that will be experienced. As previously mentioned, exhaust air from either chamber 159 or chamber 163 will exhaust to the atmosphere through the valve 160 which has its outlet port connected to an atmosphere exhaust line 167. The air pump or intensifier 155 acts to multiply the unit pressure as it actuates the hydraulic pump 150.

Hydraulic fluid is supplied to the hydraulic chamber 153 from a reservoir 170 via a branch supply line 171 which is connected between the reservoir line 172 and the main supply line 154. A check valve 173 connected in line 171 operates to allow the flow of fluid from reservoir 170 to hydraulic chamber 153 via lines 172, 171, and 154 when valve 160 is in the position which directs pressurized air flow to chamber 163. In this cycle hydraulic chamber 153 fills with fluid from the reservoir. By energizing the solenoid of valve 160, air from chamber 163 is exhausted and pressurized air is directed to chamber 159 causing piston 152 to discharge fluid from hydraulic chamber 153 into main supply line 154 for distribution to the hydraulic chambers 100 and 137 of the outrigger supports 60 and 120 respectively via branch lines 176. By alternating the flow of pressurized air to chambers 163 and 159 the fluid chamber 153 will alternately fill with fluid from reservoir 170 and discharge into the outrigger support system via lines 154 and 176. A check valve 177 in line 154 normally permits flow of fluid to the outrigger supports but automatically prevents fluid from returning to hydraulic chamber 153. A check valve 175 between branch lines 172 and 174 automatically prohibits flow of fluid from hydraulic chamber 153 to reservoir 170 via lines 154, 172, and 174. Check valve 173 between lines 171 and 172 is normally closed but does open automatically when piston 152 and chamber 153 are in the filling cycle, i.e., when pressurized air is directed to air chamber 163. An electrically operated timer 180 is employed to periodically energize and de-energize the solenoid of valve 160 to ensure that the hydraulic system is filled with fluid and maintains the selected pressure while table extension is in use.

In operation, the unloaded table extension is fitted to the machine table and outrigger supports 60A–60G and 120 are aligned in their respective positions under the way 90. At this time the expansible hydraulic chambers are at zero hydraulic pressure and the outrigger supports carry no load. Air pressure regulator 165 is then manually adjusted to a predetermined air pressure setting which produces a corresponding hydraulic pressure sufficient to support the unloaded table extension at its outrigger supports. By energizing the solenoid of valve 160 from a suitable control panel (not shown) pressurized air is admitted to the intensifier 155 producing fluid flow and pressure to the expansible hydraulic chambers of the outrigger supports. The antifriction members 81, 82 and 124 move upward into engagement with way 90 and the load of the table extension becomes supported by the outrigger supports. At this stage, pressure gages 178 and 179 show identical pressure readings. The load such as workpiece "G" is then placed on the table in an oriented position with its peripheral rim being clamped to steady rests located on workpiece supporting base 43, 51 or 57 selected in accordance with the diameter of the workpiece. With the table thus loaded the reading at gage 178 will increase due to the added load and differ from the gage 179 reading which is unchanged by the load added to the table. To compensate for the difference in fluid pressure on either side of check valve 177, the air pressure regulator is readjusted such that reading at gage 179 is increased to coincide with reading at gage 178. The outrigger support system will thus be provided with the required fluid pressure to support a particular load for as long as the table extension is loaded. To ensure that the existing workpiece table is not overloaded, the said table with its loaded table extension is to move freely when the machine's input shaft is turned by hand with a suitable wrench.

When fluid pressure between check valve 177 and piston 152 is equal to or less than the pressure between said valve and the expansible chambers of the outrigger supports, the valve 177 remains closed forming a closed hydraulic circuit containing a fixed quantity of fluid at a selected pressure. Thus, if during operation of the machine tool, one of the hydraulic chambers 100 and 137 closes slightly due to run-out (i.e. inaccuracy or alteration in the plane of the way surfaces) excess fluid from such chamber will flow into chambers of adjacent supports so as to maintain equal pressure in the chambers and equalize the load supported by each outrigger support; conversely, if the chamber of a support opens slightly, fluid will be supplied to it from adjacent supports to maintain equalized load distribution. The present invention thereby provides a workpiece supporting system in which the work table extension can support heavy loads and yet can be rotated in an accurate plane to compensate for run-out of the system, foundation settling or inaccuracies, and imperfections in the way surfaces of the table extension.

When machining operations are completed but before removing the load "G" from the table extension, the solenoid of valve 160 is deenergized, thereby relieving fluid pressure between the piston 152 and valve 177. Fluid pressure in the closed system between valve 177 and hydraulic chambers 100 and 137 of outrigger supports is maintained and continues to support the load. This pressure is due to the supported load and reduces in value in proportion to the amount of load removed. During unloading, there is no extension or contraction of chambers 100 and 137, since there is no change in the quantity of fluid in the closed circuit necessary to produce such motion. When the load is entirely removed from the table extension, valves 175 and 177 are manually opened to relieve all pressure from the closed hydraulic circuit and cause the hydraulic chambers to retract of their own structural weight and return the displaced fluid to the reservoir 170. With the hydraulic chambers fully retracted, the valves 175 and 177 are manually returned to their normal operating positions.

EXAMPLE

A gear-cutting machine of the type depicted in FIG. 1 (a Maag SH-600 machine) had an existing work table and suitable extensions which could be attached thereto that provided the capacity to handle workpieces ranging in size from 14 inches to 20 feet in diameter and weighing up to about 80,000 pounds (total table loading of about 110,000 pounds, including the workpiece and supporting fixtures); the larger diameter workpieces within this range were handled as overhanging loads without edge support. A table extension 40 of the type described hereinabove was constructed and attached to the existing worktable together with the outrigger supports 60 and 120; the completed installation was as illustrated in FIG. 1. The workpiece capacity of the machine was thereby enlarged to handle workpieces ranging from 20 feet to 40 feet in diameter and weighing up to about 312,000 pounds (total table loading of 500,000 pounds including workpieces and supporting fixtures). Thus, the worktable extension system of this invention quadrupled the weight capacity of the machine and doubled the diameter of the workpiece that could be handled. At the same time, the existing capacity of the machine for cutting small and medium size workpieces (i.e. 14 inches to 20 feet) was retained since the worktable extension 40 can be removed from the existing table when it is desired to work with workpieces under 20 feet in diameter.

The above description of a presently-preferred embodiment of this invention sets forth apparatus suitable for the support of large size workpieces which utilizes a work table extension adapted for attachment to the existing work table of a machine and means for supporting the peripheral edge of the work table extension. This workpiece supporting system enables the capacity of an existing machine to be greatly enlarged while still preserving the original machine capacity, thereby providing the machine with the capability of handling a broad range of workpiece sizes. The illustrative embodiment of the invention has been described in considerable detail so as to disclose a practical operative structure for practice of this invention, but it is to be understood that changes can be made in the apparatus described and that the novel characteristics of the invention may be incorporated in other structural forms without departing from the true spirit and scope of the invention.

I claim:

1. A workpiece supporting system for use with a machine tool of the type having an existing work table that is driven relative to a workpiece cutting mechanism comprising, in combination:
   1. a work table extension adapted for attachment to the existing work table to be driven thereby and including a peripheral edge portion extending beyond the existing work table;

2. a plurality of outrigger supports spaced about the peripheral edge portion of the work table extension, each outrigger support including
   a. first antifriction means arranged to contact the peripheral edge portion of the work table extension,
   b. second antifriction means, and
   c. hydraulic means arranged between the first and second antifriction means and adapted to apply force to the first antifriction means to counteract force applied to the work table extension by a workpiece carried thereon; and
3. a base member arranged to support each such outrigger support and including a way surface, the second antifriction means of an outrigger support being in contact with said way surface.

2. A workpiece supporting system according to claim 1 wherein:
   the peripheral edge portion of the work table extension includes an annular way surface along its underside, each outrigger support includes rollers which engage opposed edges of the annular way surface, and the first antifriction means of each outrigger support contacts the annular way surface.

3. A workpiece supporting system according to claim 2 wherein:
   the way surface of the base member for each outrigger support is a linear way surface, and
   the second antifriction means of each outrigger support engages the linear way surface for linear movement of the outrigger support along said linear way surface.

4. A workpiece supporting system according to claim 1, wherein:
   the hydraulic means of each outrigger support is connected in parallel to a hydraulic circuit,
   the hydraulic circuit includes pump means for supplying fluid under pressure to each said hydraulic means, means for controlling the pump means to establish pressure of the fluid supplied to each said hydraulic means at a selected level, and check valve means adapted to limit fluid flow in the hydraulic circuit to flow between the hydraulic means of each outrigger support after the fluid pressure therein has been established at the selected level.

5. A workpiece supporting system according to claim 1, wherein:
   the work table extension includes a central section adapted for attachment to the existing work table of the machine tool, a plurality of spaced arm members extending radially outward from the central section, and a plurality of spaced annular workpiece supporting bases attached to the outer extremities of the arm members to accommodate workpieces of different diameters.

6. A workpiece supporting system according to claim 5, further including:
   a floor plate for each outrigger support, including a plurality of base member attachment positions, there being one such position for each annular workpiece supporting base of the work table extension,
   the base member for an outrigger support being attached to an attachment position of the floor plate corresponding to a selected workpiece supporting base.

7. An outrigger support suitable for use in a workpiece supporting system such as defined in claim 1 comprising, in combination:
   1. a lower bearing carriage and an upwardly extending annular wall attached thereto,
   2. an upper bearing carriage and a downwardly extending annular wall attached thereto,
   3. the upwardly extending annular wall attached to the lower bearing carriage and the downwardly extending annular wall attached to the upper bearing carriage being interengaged to define a vertically expansible hydraulic chamber therebetween for receipt of hydraulic fluid under pressure to effect vertical movement of one bearing carriage relative to the other bearing carriage, and
   4. antifriction bearing means carried by the lower bearing carriage and by the upper bearing carriage.

8. An outrigger support according to claim 7 further including:
   limiting means arranged between the upper and lower bearing carriages to limit vertical movement therebetween.

* * * * *